United States Patent Office 2,915,044
Patented Dec. 1, 1959

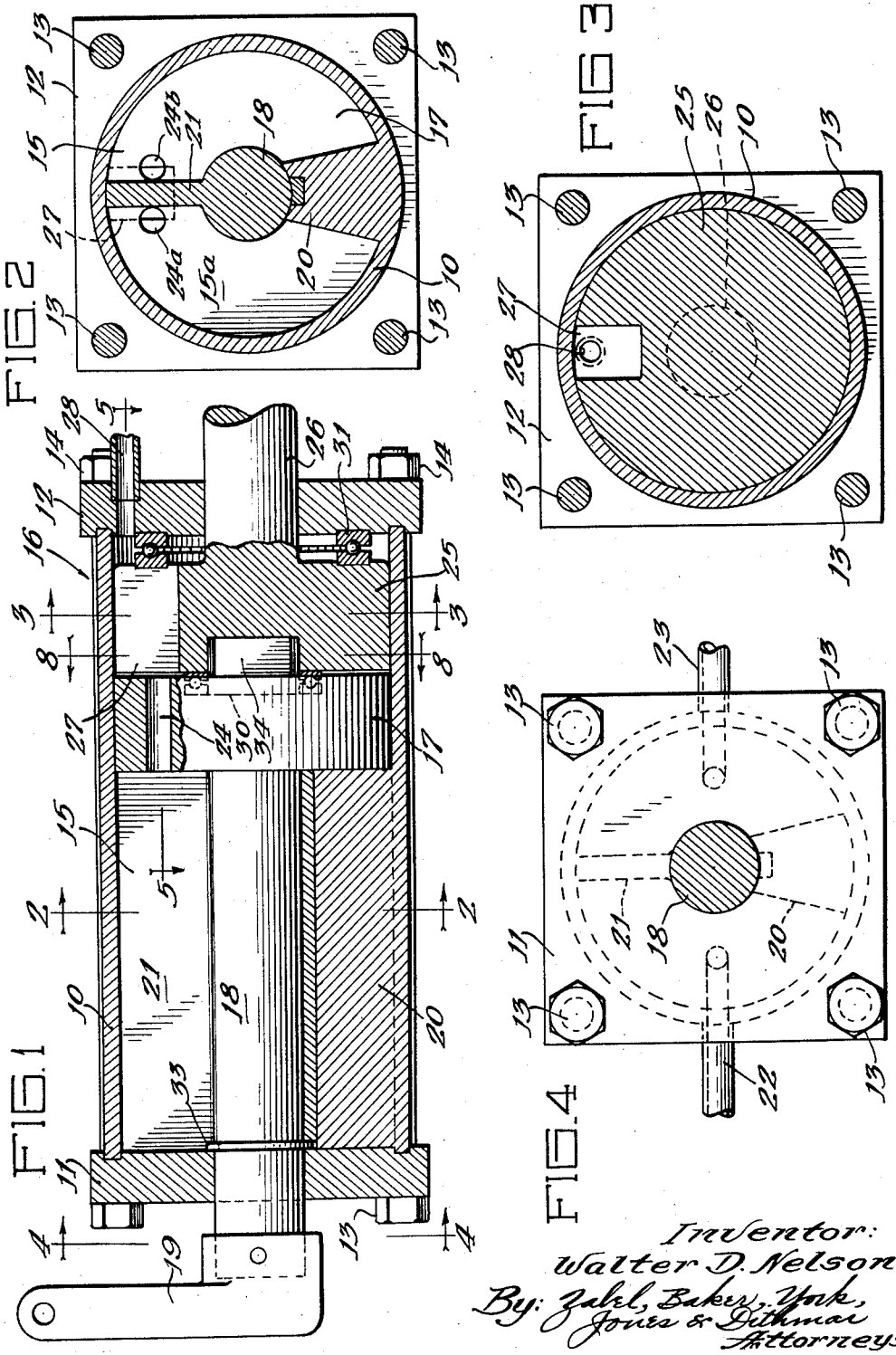

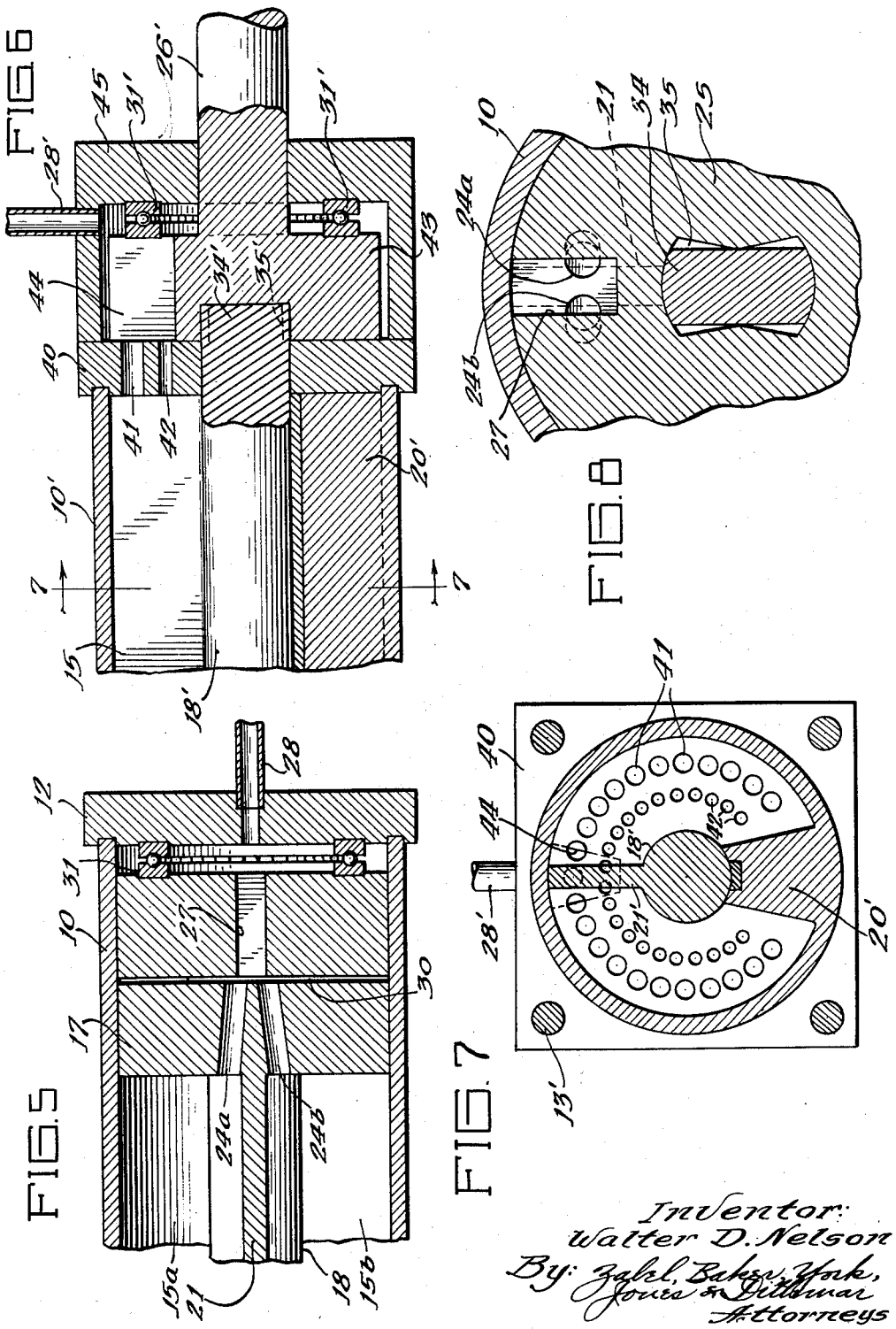

2,915,044

CONTINUOUS FLOW TYPE HYDRAULIC POWER STEERING MECHANISM

Walter D. Nelson, Chicago, Ill.

Application February 28, 1955, Serial No. 491,061

9 Claims. (Cl. 121—41)

This invention relates to an improved hydraulic actuator, of a type which is particularly adapted for use in connection with power steering mechanism, and is a continuation-in-part of my copending application, Serial No. 340,458, filed March 5, 1953, now Patent No. 2,703,149, dated March 1, 1955.

It is an object of the present invention to provide a hydraulic actuator in which the input and output shafts are aligned with each other. This aligned relationship of the elements greatly enhances the utility of the device, since the device may then be inserted at a suitable point in a straight section of shaft, without requiring change of design of the original mechanism to which the hydraulic actuator is applied, such, for instance, the steering shaft of an automobile.

A further object is to provide a hydraulic actuator which provides a positive mechanical connection between the input and output shafts, thereby permitting operation of the mechanism in case of failure of the hydraulic pressure. As applied to hydraulic steering mechanism, this is of particular utility since it permits the operator to turn the front wheels even though the motor is turned off, as when the car is parked.

A further object is to provide a power steering mechanism having improved responsiveness and sensitivity and one which is irreversible in action, and which is characterized by extreme simplicity of construction and low manufacturing cost as compared with prior art devices of this type.

Other objects, features and advantages will become apparent as the description proceeds.

With reference now to the drawings in which like reference numerals designate like parts:

Fig. 1 is a longitudinal section through a preferred embodiment of my invention;

Fig. 2 is a vertical transverse section taken along line 2—2 of Fig. 1, showing the cylinder portion;

Fig. 3 is a vertical transverse section taken along line 3—3 of Fig. 2, showing the valve portion;

Fig. 4 is a left end view of Fig. 1, taken along line 4—4 of Fig. 1;

Fig. 5 is a horizontal section taken along line 5—5 of Fig. 1;

Fig. 6 is a view similar to Fig. 1, but showing a modification;

Fig. 7 is a vertical transverse section taken along line 7—7 of Fig. 6; and

Fig. 8 is a vertical transverse section taken along line 8—8 of Fig. 1.

With reference now to Fig. 1, the hydraulic actuator comprises a tubular member 10, the ends of which fit into and are enclosed by end pieces 11 and 12. The assembly is held together by tie bolts 13 and nuts 14. The elements 10, 11 and 12 provide an enclosure, the left end of which comprises a cylinder chamber or portion 15, and the right end of which comprises a valve chamber or portion 16, the two portions being separated from each other to define chambers by means of a rotatable disk 17.

An output shaft 18 is journaled in the end piece 11 and extends into the cylinder chamber 15, the disk 17 being secured to, or forming a part of the shaft 18, so that the two will rotate with each other. Suitable mechanism can be connected to the output shaft 18, and in the case of power steering mechanism, this connection is made by pitman arm 19 which can be connected directly to a suitable drag link or the like.

The cylinder and piston mechanism herein described can be referred to as a "butterfly" type of cylinder and piston or as an oscillating motor of the continuous flow type. Secured to, or formed integral with the tubular member 10 is a stationary divider 20 which extends from the tubular member up to the output shaft 18. Secured to or formed integral with the output shaft 18 is a vane 21. The relationship of these parts is shown in Fig. 2, and it will be observed that the elements 20 and 21 cooperate with each other to divide the interior of the cylinder chamber into two parts 15a and 15b, either one of which comprises an expansible chamber with respect to the other. In view of the reciprocal or supplementary relationship between these two chambers 15a and 15b, each chamber is actually an expansible-contractible chamber, and the term "expansible chamber" as used herein designates either one of the chambers, irrespective of whether it is expanding or contracting in volume.

Suitable inlet means may be provided for each of the expansible chambers 15a and 15b, such as the inlet ports and nipples 22 and 23 shown in Fig. 4, the ports being formed in the end wall 11, and the nipples or other connecting means being threaded into the ports.

Each of the inlet means 22 and 23 is connected to a source of hydraulic pressure, such as separate pumps, not shown, and which form a closed system which includes the return port and nipple 28, shown in Fig. 1. If the pressure in the expansible chamber 15a is or becomes greater than the pressure in chamber 15b, then the vane 21 and the output shaft 18, will move to the right or in the clockwise direction, as viewed in Fig. 2, and vice-versa. In other words, in this butterfly type of cylinder, the butterfly piston and the output shaft are rotated.

The pressure within the expansible chambers 15a and 15b is regulated by outlet port means formed in the disk 17 and by valve means which cooperate therewith. The outlet port means comprise separate passageways 24a and 24b which extend through the disk 17, one for each of the expansible chambers 15a and 15b respectively. These passageways are referred to generically herein as outlet ports 24.

The valve means comprise a valve member 25, in the form of a disk, which is secured to or formed integrally with an input shaft 26 which is journaled in the end member 12. The disk 25 is provided with a slot 27 which, in normal position, that is, during pressure equilibrium, registers with a portion of each of the outlet ports 24. In other words, the width of the slot 27 may be equal to, or somewhat less than the distance between the port centers, as shown in Figs. 5 and 8.

In operation, it will be seen from an inspection of Figs. 5 and 8, that as the valve disk 25 is rotated toward the left, as viewed in Fig. 8, the open port area of port 24a will be cut down and the open port area of port 24b will be increased. This causes the pressure in expansible chamber 15a to increase and the pressure in expansible chamber 15b to decrease, with the result that the vane 21, and the output shaft 18 will rotate in the counterclockwise direction, thus following the counterclockwise movement of the shaft 26 and the valve disk 25.

In other words, rotation of the input shaft 26 merely shifts the open port area, or regulates the valve, and, therefore, requires no substantial input torque. On the other hand, the torque imparted to the output shaft 18 is very substantial, depending upon the vane area and the pressure differential.

A suitable thrust bearing 30 may be provided between the rotatable disk 17 and the valve disk 25, and may be countersunk into one of these elements so as to minimize the clearance between these elements as much as possible, the clearance shown being considerably exaggerated. Minimum clearance is desirable in order to secure proper valve action. Similarly, a suitable thrust bearing 31 may be interposed between the valve disk 25 and the end piece 12. The thrust bearings 30 and 31 materially reduce the load on the input shaft, and radial bearings may be inserted elsewhere, as needed.

Suitable means may be provided to prevent outward movement of the output shaft 18, such as the lock ring 33, shown in Fig. 1.

Although a certain amount of free movement of the input shaft with respect to the output shaft is necessary for valve operation, as pointed out above, an important feature of the present invention is the fact that the coaxial arrangement of the input and output shafts permits a mechanical connection to be provided between the two which will enable the input shaft to drive the output shaft when there is no hydraulic pressure, that is, when the supply means is inoperative.

This means comprises a lost motion connection between the two, best shown in Fig. 8. The output shaft 18 projects beyond, or to the right of, the valve disk 25, and is slabbed as shown in Fig. 8, to provide a slabbed pilot 34. This is received within an opening 35 formed in the valve disk 25. The opening 35 is of a width somewhat greater than the width of the slabbed pilot, and its length may be the same, or greater. The preferred arrangement is shown in Fig. 8 in which the end walls of the opening 35 are arcuate and closely fit the radius of the pilot, and in which the side walls are generally hour glass shape to permit the proper distribution of stress, when the input shaft drives the output shaft. It is apparent that the valve member 25 needs to extend only a sufficient distance on either side of the slot to provide effective valve action, although the valve member is shown herein as being in the form of a disk to provide sufficient wall thickness around the enlarged opening 35 and to insure proper distribution of stress.

In the modification shown in Figs. 6 and 7, those parts which are substantially identical to the parts shown in Figs. 1–6 and 8 are identified by the same reference numeral but primed, as employed in connection with the first embodiment.

In Figs. 6 and 7, the cylinder chamber 15 is closed at its right end by a stationary wall 40, rather than by the rotatable disk 17 of Fig. 1. The stationary wall 40 may be in the form of an end plate which cooperates with the tubular member 10' in the same manner as end plate 12. The wall member 40 is provided with two series of outlet ports arranged in concentric arcs with respect to the axis of the output shaft 18, an outer series of ports 41 and inner series of ports 42. The valve member 43 may be substantially the same as the valve disk 25, and is mounted on an input shaft 21' and is provided with a slot 44. However, as shown in Fig. 7, the walls of the slot 44 are preferably radially disposed, and the width of the slot is somewhat greater than the width of the vane 21'. The valve member 43 is enclosed by a suitable housing 45, the housing being suitably secured to the stationary wall 40. The return port and nipple 28' are formed in and secured to the housing 45.

The separate ports 41 of the outer series are staggered with respect to the separate ports 42 of the inner series, and the distance between adjacent ports in the same series is less than the port diameter. Thus, the port area provided by one series overlaps, at all points, the port area provided by the other series, to provide that which is referred to herein as a "continuous port area," and as explained in greater detail in the aforementioned copending application.

The open port area is that part of the port area which is not covered by the valve disk 43; or, to put is conversely, that part of the outlet port area which is exposed by the slot 44. The depth and width of the slot 44 may desirably be such that when the parts are in the position of equilibrium shown in Fig. 7, and symmetrically disposed with respect to one of the ports 41, the slot will expose substantially one-half of the area of the adjacent ports 41, and a portion of the port area of two adjacent inner ports 42. However, there may be substantial variation in the dimensions indicated without affecting the operation and without departing from the spirit of my invention.

In the modification, a suitable lost motion connection may be provided between the output shaft 18' and the input shaft 26', similar to that shown in Fig. 8, and identified by the reference numerals 34' for the pilot and 35' for the recess in Fig. 6. However, in the modification, the clearance between the recess 35' and the pilot 34' may be somewhat increased over that shown in Fig. 8, to permit a greater degree of lost motion, in those instances in which it is desired to take advantage of the more rapid action provided by the use of a continuous series of ports in a stationary wall member as contrasted with the provision of only one port for each expansible chamber, when the ports are located in a rotatable wall portion, as shown in Fig. 1. However, in either embodiment, the rapidity of action can be increased by increasing the diameter of the outlet ports 24, or 41 and 42.

In either modification, a high degree of sensitivity can be attained. Furthermore, in spite of the mechanical connection between the input and output shafts, the action is substantially irreversible since the lost motion connection requires a substantial degree of movement of the output shaft before corresponding motion is imparted to the valve means, and this motion of the output shaft is in a direction opposite to the direction of pressure differential created by such movement.

To summarize the operation, which has been described in connection with the description of the various parts, rotation of the input shaft 26, or 26', will cause a shifting of the discharge area of the ports 24 or 41 and 42; that is, the open port area will be shifted. Assuming that two pumps, not shown, each provide equal delivery at equal pressures to the inlet ports 22 and 23, the pressure within each of the expansible chambers 15a and 15b will be determined by the discharge or open port area provided for each chamber, thus building up a pressure differential which actuates the output shaft 18 or 18'.

The present invention provides a construction in which the input and output shafts are aligned with each other, thereby considerably simplifying the application of or installation of the hydraulic actuator to existing mechanisms.

Furthermore, the alignment of the shafts permits a simple type of mechanical connection to be made between the two shafts so that the mechanism in which the actuator is installed will be operative even though the pressure supply means is inoperative.

Although I have shown and described herein only preferred embodiments of my invention, it will be understood that various modifications and changes may be made in the constructions shown without departing from the spirit of my invention as pointed out in the appended claims.

I claim:

1. A hydraulic actuator of the butterfly cylinder type comprising means, including end wall means, providing a butterfly cylinder, said end wall means comprising a stationary wall member forming a part of said butterfly cylinder providing means, a butterfly piston rotatably mounted in said butterfly cylinder and serving to divide the interior of said cylinder into two expansible chambers, an inlet for each chamber, outlet port means located in said end wall means, and comprising a series of ports formed in said stationary wall member and arranged in a circular arc to provide passageways for each of said expansible chambers, valve means cooperating with said outlet port means to regulate the fluid pressure differential between said expansible chambers, said butterfly piston including a vane and an output shaft, and said valve means including an input shaft axially aligned with said output shaft, one of said shafts being slotted and the other being provided with a slabbed portion received within said slotted shaft and being narrower than the same to provide a lost motion connection between said aligned input and output shafts.

2. A hydraulic actuator as claimed in claim 1 in which said port means includes a second series of ports formed in said stationary wall member and concentrically arranged in a circular arc with respect to said first series, the apertures of each series being staggered with respect to each other so as to provide a continuous overlapping port area, and in which said valve means includes a valve port having a width dimension greater than the width of said vane whereby a continuous open port area, of a width greater than the width of said vane, is provided by the cooperation of said valve means and said port means.

3. A hydraulic actuator of the butterfly cylinder type comprising means providing a butterfly cylinder, a butterfly piston rotatably mounted in said butterfly cylinder and serving to divide the interior of said cylinder into two expansible chambers, an inlet for each chamber, said butterfly piston including an output shaft and a disk mounted on said output shaft and rotating therewith and cooperating with the peripheral wall of said butterfly cylinder to define said expansible chambers, outlet port means formed in said disk and comprising one passageway for each of said expansible chambers and partially blocking both of said passageways when in normal position, and valve means cooperating with said port means to regulate the fluid pressure differential between said expansible chambers, said valve means including an input shaft aligned with said output shaft, and means maintaining said input shaft in axial alignment with said output shaft so that proper operating relationship can be maintained between said valve means and said port means.

4. A hydraulic actuator as claimed in claim 3 in which said butterfly piston is provided with a slabbed pilot, and in which said valve means is provided with an enlarged hour-glass shaped opening receiving said pilot, said pilot and said opening providing a mechanical connection permitting a limited amount of lost motion.

5. A hydraulic actuator comprising means providing a cylinder chamber and a valve chamber and including a wall member separating said cylinder chamber from said valve chamber, an output shaft extending into said cylinder chamber, a divider member extending between the wall of said cylinder chamber and said shaft, and being secured to said cylinder chamber, said shaft being rotatably mounted with respect to said cylinder chamber and said divider, a vane extending between said shaft and the wall of said cylinder chamber and being secured to said shaft and rotatable therewith, said vane and said divider cooperating to divide the interior of said cylinder chamber into two expansible chambers, an inlet for each chamber, a plurality of outlet ports extending through said wall member and providing communication between each expansible chamber and said valve chamber, an input shaft extending into said valve chamber, and a valve member carried on said input shaft and disposed adjacent to said wall member to block off portions of said outlet ports, said valve member also providing a valve port aligned with other portions of said outlet ports, whereby angular displacement of said valve member with respect to said wall member will decrease the port area communicating with one of said expansible chambers and simultaneously increase the port area communicating with the other to create a pressure differential causing actuation of said butterfly piston.

6. A hydraulic actuator comprising means providing a cylinder chamber and a valve chamber adjacent thereto and including a common wall member separating said cylinder chamber from said valve chamber, an output shaft extending into said cylinder chamber, a divider member extending between the wall of said cylinder chamber and said shaft, and being secured to said cylinder chamber, said shaft being rotatably mounted with respect to said cylinder chamber and said divider, a vane extending between said shaft and the wall of said cylinder chamber and being secured to said shaft and rotatable therewith, said vane and said divider cooperating to divide the interior of said cylinder chamber into two expansible chambers, an inlet for each chamber, a plurality of outlet ports extending between and providing communication between each expansible chamber and said valve chamber, an input shaft extending into said valve chamber, a valve member carried on said input shaft and disposed adjacent to said wall member to block off portions of said outlet ports, said valve member also providing a valve port aligned with other portions of said outlet ports, whereby angular displacement of said valve member with respect to said wall member will decrease the port area communicating with one of said expansible chambers and simultaneously increase the port area communicating with the other to create a pressure differential causing actuation of said butterfly piston, and a lost motion connection between said input shaft and said output shaft providing direct mechanical connection between the two in case of failure of hydraulic pressure.

7. A hydraulic actuator comprising means providing a cylinder chamber and a valve chamber, an output shaft extending into said cylinder chamber, a divider member extending between the wall of said cylinder chamber and said shaft, and being secured to said cylinder chamber, said output shaft being rotatably mounted with respect to said cylinder chamber and said divider, a butterfly piston in the form of a vane extending between said shaft and the wall of said cylinder chamber and being secured to said shaft and rotatable therewith, said vane and said divider cooperating to divide the interior of said cylinder chamber into two expansible chambers, an inlet for each chamber, a rotatable disk secured to said output shaft and separating said cylinder chamber from said valve chamber, two outlet ports extending through said disk, one for each expansible chamber, an input shaft extending into said valve chamber, and a valve member carried on said input shaft and disposed adjacent to said disk to block off portions of said outlet ports, said valve member also providing a valve port aligned with other portions of said ports, whereby angular displacement of said valve member with respect to said disk will decrease the port area communicating with one of said expansible chambers and simultaneously increase the port area communicating with the other to create a pressure differential causing actuation of said butterfly piston.

8. A hydraulic actuator comprising means providing a cylinder chamber and a valve chamber, an output shaft extending into said cylinder chamber, a divider member extending between the wall of said cylinder chamber and said shaft, and being secured to said cylinder chamber, said output shaft being rotatably mounted with respect to said cylinder chamber and said divider, a butterfly piston in the form of a vane extending between said shaft and the wall of said cylinder chamber and being secured to said shaft and rotatable therewith, said vane and said divider cooperating to divide the interior of said cylinder chamber into two expansible chambers, an inlet for each chamber, a rotatable disk secured to said output shaft and separating said cylinder chamber from said valve chamber, two outlet ports extending through said disk, one for each expansible chamber, an input shaft extending into said valve chamber, a valve member carried on said input shaft and disposed adjacent to said disk to block off portions of said outlet ports, said valve member also providing a valve port aligned with other portions of said ports, whereby angular displacement of said valve member with respect to said disk will decrease the port area communicating with one of said expansible chambers and simultaneously increase the port area communicating with the other to create a pressure differential causing actuation of said butterfly piston, and a lost motion connection between said input shaft and said output shaft providing direct mechanical connection between the two in case of failure of hydraulic pressure and serving to maintain said valve member centered in said valve chamber.

9. A hydraulic actuator comprising a tubular member and two end pieces cooperating therewith, a butterfly piston assembly disposed within said tubular member and comprising an output shaft journaled in one of said end pieces, a vane on said output shaft, a disk extending between said output shaft and said tubular member and dividing said tubular member into a cylinder chamber and a valve chamber, and a slabbed pilot extending beyond said disk, a divider member secured to said tubular member and extending into engagement with said shaft, said divider and said vane cooperating to divide the interior of said cylinder chamber into two expansible chambers, an inlet for each chamber, two outlet ports formed in said disk at points immediately adjacent said vane and on opposite sides thereof, one for each expansible chamber, an input shaft journaled in the other one of said end members, a valve disk secured to said input shaft, a valve port extending through said valve disk and having a width equal substantially to the distance between the centers of said outlet ports, said input shaft being aligned with said output shaft, and a non-circular opening formed in the face of said valve disk and receiving said slabbed pilot to provide a lost motion connection between said input shaft and said output shaft, said valve disk being centered by said slabbed pilot to maintain proper operating relationship between said valve port and said outlet ports.

References Cited in the file of this patent

UNITED STATES PATENTS

| | | |
|---|---|---|
| 821,398 | Bergesen | May 22, 1906 |
| 1,859,333 | Josephs | May 24, 1932 |
| 2,020,847 | Mitereff | Nov. 12, 1935 |
| 2,481,426 | Hull | Sept. 6, 1949 |
| 2,735,406 | Britton | Feb. 21, 1956 |

FOREIGN PATENTS

| | | |
|---|---|---|
| 406,934 | Germany | Dec. 4, 1924 |
| 854,278 | Germany | Nov. 4, 1952 |